United States Patent
Swearingen

(10) Patent No.: US 9,505,567 B2
(45) Date of Patent: Nov. 29, 2016

(54) AUTOMATIC BAFFLE CONTROL FOR TRUCK-RECEIVING HOPPER OF MATERIAL TRANSFER VEHICLE

(71) Applicant: Roadtec, Inc., Chattanooga, TN (US)

(72) Inventor: David Swearingen, Ooltewah, TN (US)

(73) Assignee: Roadtec, Inc., Chattanooga, TN (US)

( * ) Notice: Subject to any disclaimer, the term of this patent is extended or adjusted under 35 U.S.C. 154(b) by 32 days.

(21) Appl. No.: 14/563,258

(22) Filed: Dec. 8, 2014

(65) Prior Publication Data

US 2015/0166274 A1    Jun. 18, 2015

Related U.S. Application Data

(60) Provisional application No. 61/916,406, filed on Dec. 16, 2013.

(51) Int. Cl.
*B65G 67/08* (2006.01)
*B65G 67/02* (2006.01)
*B65G 67/24* (2006.01)
*E01C 19/48* (2006.01)

(52) U.S. Cl.
CPC ............ *B65G 67/02* (2013.01); *B65G 67/08* (2013.01); *B65G 67/24* (2013.01); *E01C 19/48* (2013.01); *E01C 2301/04* (2013.01)

(58) Field of Classification Search
CPC ........ E01C 19/00; E01C 19/02; E01C 19/10; E01C 19/48; E01C 23/00; E01C 23/06; B65G 67/02; B65G 67/08; B65G 67/24
USPC .......................................... 414/528; 404/101
See application file for complete search history.

(56) References Cited

U.S. PATENT DOCUMENTS

| 3,378,152 A | * | 4/1968 | Warner ................. B65G 67/24 198/582 |
| 3,678,817 A | * | 7/1972 | Martenson .......... E01C 19/4873 404/108 |
| 4,012,160 A | * | 3/1977 | Parker ................ E01C 19/4873 404/84.05 |

(Continued)

FOREIGN PATENT DOCUMENTS

| CN | 2729129 Y | 9/2005 |
| CN | 201721850 U | 1/2011 |

(Continued)

*Primary Examiner* — James Keenan
(74) *Attorney, Agent, or Firm* — Chambliss, Bahner & Stophel, P.C.

(57) ABSTRACT

A system and method for automatically controlling the flow of asphalt material from a truck-unloading hopper of a material transfer vehicle into the entry end of an adjacent truck-unloading conveyor in order to optimize at least one vehicle operating parameter includes a baffle mounted to the truck-unloading hopper adjacent to the entry end of the truck-unloading conveyor. The baffle is adapted to increase or decrease the hopper opening into the truck-unloading conveyor. A controller is operatively connected to the baffle and adapted to cause the baffle to increase or decrease the hopper opening into the truck-unloading conveyor. A sensor is provided for detecting at least one vehicle operating parameter. This sensor is operatively connected to the controller so that changes in the at least one vehicle operating parameter can be communicated to the controller. The controller is adapted to control the flow rate of asphalt material into the truck-unloading hopper in order to optimize the at least one vehicle operating parameter.

18 Claims, 5 Drawing Sheets

(56) References Cited

U.S. PATENT DOCUMENTS

| | | |
|---|---|---|
| 4,823,366 A | 4/1989 | Williams |
| 5,015,120 A * | 5/1991 | Brock ............... B60P 1/38 |
| | | 404/108 |
| 5,100,277 A * | 3/1992 | Musil ............... E01C 19/48 |
| | | 404/108 |
| 5,197,848 A | 3/1993 | Musil et al. |
| 5,452,966 A | 9/1995 | Swisher, Jr. |
| 5,533,828 A | 7/1996 | Campbell |
| 5,533,829 A | 7/1996 | Campbell |
| 5,615,973 A | 4/1997 | Campbell |
| 5,851,085 A | 12/1998 | Campbell |
| 9,260,827 B2 * | 2/2016 | Bertz ............... E01C 19/48 |
| 2010/0091103 A1 * | 4/2010 | Peltonen ............... B02C 21/02 |
| | | 348/82 |

FOREIGN PATENT DOCUMENTS

| | | |
|---|---|---|
| CN | 202667621 U | 1/2013 |
| CN | 203158845 U | 8/2013 |
| CN | 103587973 A | 2/2014 |

* cited by examiner

AUTOMATIC BAFFLE CONTROL FOR TRUCK-RECEIVING HOPPER OF MATERIAL TRANSFER VEHICLE

CROSS-REFERENCE TO RELATED APPLICATION

This application claims the benefit of U.S. Provisional Patent Application No. 61/916,406 which was filed on Dec. 16, 2013.

FIELD OF THE INVENTION

This invention relates generally to a material transfer vehicle that is adapted for transferring asphalt from a supply truck to an asphalt paving machine. More particularly, the invention relates to a mechanism for controlling the power demand of the truck-unloading conveyor of a material transfer vehicle by controlling the rate of introduction of material from the supply truck to the surge bin of the material transfer vehicle.

BACKGROUND OF THE INVENTION

The traditional process for paving roadways with asphalt material is generally carried out by an asphalt paving machine and a number of supply trucks which transport the asphalt material from an asphalt production plant to the paving machine. The paving machine generally is self-propelled and driven by a wheeled or tracked drive system. A hopper is located at the front end of the machine to receive asphalt material from a truck, and a floating screed is located at the rear end of the machine to form the asphalt mat. A conveyor system typically comprised of slat conveyors and screw augers delivers the asphalt material from the hopper to the road base just ahead of the screed.

A typical asphalt paving machine has a hopper with a capacity of 5-15 tons, whereas a typical dump-type delivery truck has a capacity of about 20 tons. The front of the paving machine is usually provided with rollers which are adapted to engage the rear tires of a delivery truck. This arrangement enables asphalt material to be transferred from the truck to the asphalt paving machine by positioning the delivery truck in front of the paving machine and raising the dump bed of the truck to dump the asphalt material into the hopper as the paving machine pushes the truck along in front of it. Because the delivery truck usually carries more asphalt material than the hopper can receive at one time, the paving machine may push the delivery truck along for several minutes while its conveyor system transports the asphalt material out of the hopper to the roadway in front of the screed.

Sometimes, problems may arise when operating the paving machine and the delivery trucks in this manner. Because of traffic conditions and other unforeseen delays, it is not uncommon for the paving machine to empty its hopper of asphalt material before a loaded delivery truck is available to begin dumping its asphalt material into the hopper. When this occurs, the paving machine must stop paving and await the arrival of another delivery truck. Even if one or more loaded delivery trucks are available to dump asphalt material into the paving machine hopper, it may be necessary to stop the paving machine. Sometimes, it is simply impossible for the truck drivers to remove an empty delivery truck from engagement with the front of the paving machine and to maneuver a loaded truck into position to dump into the hopper before the hopper is emptied.

As is known to those having ordinary skill in the art to which the invention relates, when a paving machine stops, even for a short time, the screed will tend to settle into the freshly laid asphalt mat. Then, when the paving machine resumes its forward motion, the screed will tend to ride upwardly momentarily, thus depositing an excessive amount of asphalt material on the roadway. Consequently, stopping of the paving machine causes a depression and a bump in the surface of the asphalt mat, resulting in an uneven pavement surface. Therefore, in recent years, material transfer vehicles have been employed to shuttle asphalt material between the delivery trucks and the paving machine. Such a material transfer vehicle is described in various embodiments in U.S. Pat. Nos. 4,818,139, 5,015,120, 5,035,534 and U.S. Pat. No. 7,160,056, which are incorporated herein by reference. These patents describe a self-propelled material transfer vehicle which includes a large-capacity truck-receiving hopper and a large-capacity truck-unloading conveyor extending from this hopper to a surge bin that is sized to hold the entire load of a delivery truck. A conveyor in the surge bin is adapted to transfer asphalt material to a paver-loading conveyor that is pivotable about an essentially vertical axis so that the transfer vehicle can be positioned alongside an asphalt paving machine that is laying an asphalt mat and rapidly discharge a truckload of asphalt material into the paver's hopper. Because of its rapid loading and unloading capabilities, the material transfer vehicle can rapidly shuttle between delivery trucks at a pick-up point and a paving machine that is laying an asphalt mat so that there is less likelihood that the paving machine will have to stop paving because of a lack of asphalt material.

It is known to provide systems for controlling the flow of asphalt material in an asphalt paving machine or a material transfer vehicle based upon devices or sensors that detect the height of material in or adjacent to the machine. These systems typically are used to insure that sufficient asphalt material is available for a paving operation. Thus, for example, U.S. Pat. No. 3,678,817 describes a system for controlling the flow of asphalt material to the distributing auger of an asphalt paving machine by employing a sensing paddle to float or move upwardly when the asphalt material in the pre-work station (immediately in front of the distributing auger) is sufficiently high to engage the paddle. A control system is operatively connected to the paddle and to a hydraulic cylinder that is connected to a movable gate adjacent to the distributing auger. The position of the gate controls the rate of delivery of asphalt material from the hopper of the paving machine to the distributing auger. U.S. Pat. No. 4,823,366 describes an asphalt paving machine having a system similar to that of U.S. Pat. No. 3,678,817, except that the sensing paddle is replaced with a non-contact sensor that is mounted on the paving machine and adapted to detect the top surface of paving material immediately to the front of the distributing auger. U.S. Pat. No. 5,100,277 describes a material transfer vehicle that is adapted to be mounted to the front end of a paving machine. The material transfer vehicle has a truck-unloading conveyor with a discharge end that is disposed above the feed hopper of the paving machine. The truck-receiving hopper of the material transfer vehicle is attached at the lower intake end of the truck-unloading conveyor, and a gate is mounted on the hopper above an opening onto the truck-unloading conveyor. The transfer of material to the paving machine is controlled by positioning the gate based upon signals received from an ultrasonic sensor that monitors the height of material in the hopper of the paving machine. U.S. Pat. No. 5,452,966 describes an asphalt paving machine having a front hopper and a belt conveyor which extends from the hopper through a tunnel to a pair of distributing augers at the rear of the machine. Two vertical gates are mounted at the rear of the tunnel, each of which is adapted to be moved upwardly and downwardly as controlled by feed sensors that detect the level of paving material on the roadway in front of the distributing augers.

Although it is known to provide a system for using gates to control a flow of asphalt material in order to provide a sufficient supply based upon the level of material in or adjacent to an asphalt paving machine or material transfer vehicle, these known systems are not adapted to maximize the efficiency of the machine or vehicle. It would be desirable if an automatic system could be provided to control the power demand of the truck-unloading conveyor of a material transfer vehicle by controlling the rate of introduction of asphalt material from the supply truck to the surge bin of the material transfer vehicle, thereby maximizing the efficiency of the material transfer vehicle.

Advantages of the Invention

Among the advantages of a preferred embodiment of the invention is that it provides an automatic system for controlling the power demand of the truck-unloading conveyor of a material transfer vehicle by controlling the rate of introduction of asphalt material from the supply truck onto the truck-unloading conveyor of the material transfer vehicle. This system improves the efficiency of the asphalt material unloading system of the material transfer vehicle by optimizing the flow rate of asphalt material onto the truck-unloading conveyor. Such a system optimizes the speed at which a supply truck may be unloaded and reduces the likelihood that the truck-unloading conveyor may stall or that the engine of the material transfer vehicle will be overtaxed by the unloading operation.

Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Several terms are specifically defined herein. These terms are to be given their broadest possible construction consistent with such definitions, as follows:

The term "asphalt material" refers to a bituminous paving mixture that is comprised of asphalt binder and any of various aggregate materials, and which is used for paving purposes.

The terms "asphalt paving machine" and "paver" refer to a finishing machine for applying asphalt material to form an asphalt mat on a roadway, parking lot or similar surface. An asphalt paving machine or paver is typically a self-propelled vehicle having a hopper at one end for receiving asphalt material and a floating screed at the other end for forming an asphalt mat.

The term "asphalt mat" refers to a layer of asphalt material such as is applied by an asphalt paving machine to produce a roadway, parking lot or similar surface.

The term "material transfer vehicle" refers to a vehicle that is adapted to receive a truck-load of asphalt material and transfer it into the hopper of an asphalt paving machine. A material transfer vehicle includes a truck-receiving hopper that is adapted to receive asphalt material from a truck, and a truck-unloading conveyor that is adapted to receive asphalt material from the truck-receiving hopper.

As used herein, the term "entry end", when used in connection with the truck-unloading conveyor of a material transfer vehicle, refers to the end of the conveyor adjacent to and in communication with the truck-receiving hopper.

The term "linear actuator" refers to an electric, hydraulic, electro-hydraulic or mechanical device that generates force which is directed in a straight line. One common example of a "linear actuator" is a double-acting hydraulic actuator which includes a cylinder, a piston within the cylinder, and a rod attached to the piston. By increasing the pressure within the cylinder on one side of the piston (over that on the opposite side of the piston), the rod will extend from the cylinder or retract into the cylinder.

The term "rotary actuator" refers to an electric, hydraulic or electro-hydraulic motor or other device that generates force that is directed along an arc or about a center of rotation.

The term "actuator" refers to a linear actuator and/or a rotary actuator.

SUMMARY OF THE INVENTION

The invention comprises a system and method for automatically controlling the flow of asphalt material from a truck-receiving hopper of a material transfer vehicle into the entry end of an adjacent truck-unloading conveyor in order to optimize at least one vehicle operating parameter. A baffle is mounted to the truck-receiving hopper adjacent to the entry end of the truck-unloading conveyor, which baffle is adapted to increase or decrease the hopper opening into the truck-unloading conveyor. A controller is operatively connected to the baffle and adapted to cause the baffle to increase or decrease the hopper opening into the truck-unloading conveyor. A sensor is provided for detecting at least one vehicle operating parameter. This sensor is operatively connected to the controller so that changes in at least one vehicle operating parameter can be communicated to the controller. The controller is adapted to control the flow rate of asphalt material into the truck-unloading hopper in order to optimize at least one vehicle operating parameter.

A preferred embodiment of the invention includes sensors that are adapted to detect changes in the hydraulic pressure in the drive system for the truck-unloading conveyor, and/or to detect changes in the speed of the engine that provides power for the drive system of the truck-unloading conveyor. These sensors are also adapted to communicate these changes to the controller. In this embodiment of the invention, the controller will control the size of the hopper opening into the truck-unloading conveyor in order to optimize the hydraulic pressure in the drive system for the truck-unloading conveyor, and/or to optimize the operating speed of the engine that provides power for the drive system of the truck-unloading conveyor.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

DETAILED DESCRIPTION OF THE PREFERRED EMBODIMENTS

Figure 1:
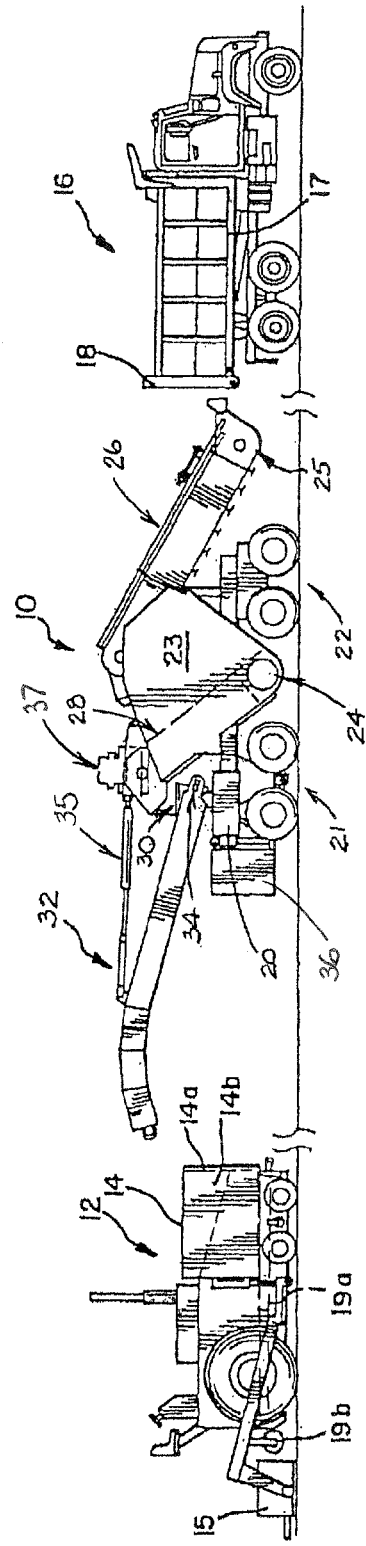
FIG. 1 is a side view of a material transfer vehicle in association with an asphalt supply truck and an asphalt paving machine.

As shown in FIG. 1, self-propelled material transfer vehicle 10 is positioned adjacent to asphalt paving machine 12 and conventional asphalt supply truck 16. Paving machine 12 may be operated to pave roadway 13 in a direction from left to right, as shown in FIG. 1. Paving machine 12 includes hopper 14 at its front end. In the embodiment shown in FIG. 1, hopper 14 has been expanded by providing front wall 14a and side walls 14b of increased height. Paving machine 12 also includes vibratory screed 15 at its rear end, and a conventional conveyor system comprising longitudinally disposed conveyors 19a and transversely disposed screw auger 19b for delivering the asphalt from hopper 14 to a position just in advance of screed 15 where it is discharged onto the surface to be paved. Conventional supply truck 16 includes a pivotally mounted bed 17 with a tailgate 18, and is adapted to deliver asphalt material from a remote source to material transfer vehicle 10. Preferably, the supply truck delivers the asphalt material to the material transfer vehicle at a convenient location remote from the paving machine, and then the material transfer vehicle transports the asphalt material to the paving location for discharge into paving machine hopper 14. Thus, material transfer vehicle 10 is adapted to shuttle between asphalt supply trucks at an asphalt receiving location and a paving machine that is engaged in paving a roadway.

Material transfer vehicle 10 includes frame 20 that is supported on the roadway surface by first wheel set 21 and second wheel set 22. Each of the wheel sets is driven by a hydraulic motor (not shown) that is supplied with fluid under pressure by one or more hydraulic pumps (also not shown). Vehicle 10 includes surge bin 23 that is mounted on frame 20 and includes transverse auger 24 that is employed to mix the asphalt material in the surge bin in order to minimize segregation or separation of the aggregate portion of the asphalt material by size. Vehicle 10 also includes truck-receiving hopper 25 and truck-unloading conveyor 26 for receiving asphalt material from delivery truck 16 and for conveying it to the surge bin. Truck-unloading conveyor 26 includes a conventional drive system that includes a hydraulic pump that powers one or more hydraulic motors.

Hopper 25 of material transfer vehicle 10 is generally of the same width as truck bed 17 and is adjustable in length so that the contents of truck 16 can be easily and quickly emptied into the hopper. Material transfer vehicle 10 is provided with a conventional mechanism such as one or more actuators (not shown) for moving hopper 25 vertically between a lowered asphalt material-receiving position that is optimally positioned to allow a supply truck to dump its asphalt material load into the hopper and one or more raised positions including the travel position that is shown in FIG. 1. Conveyor 26 is of the drag-slat type and is adapted to convey asphalt material from truck-receiving hopper 25 into surge bin 23. Drag-slat discharge conveyor 28 is located along the sloped side of surge bin 23 opposite truck-unloading conveyor 26 and is adapted to convey asphalt material out of the surge bin to chute 30 which is associated with paver-loading conveyor 32. Asphalt material conveyed out of the surge bin by conveyor 28 falls through chute 30 and onto paver-loading conveyor 32. Paver-loading conveyor 32 is also of the drag-slat type and is mounted for vertical pivotal movement about pivot 34 as raised and lowered by linear actuator 35. Conveyor 32 is also adapted for side-to-side movement about a vertical axis (not shown) that extends through hopper 30 by operation of another actuator (also not shown). Hydraulic drive systems including hydraulic pumps and hydraulic motors are provided to drive transverse auger 24 and the various conveyors, and engine 36 provides the motive force for the hydraulic pumps that drive the hydraulic motors for the wheel sets, the transverse auger and the various conveyors, including (but not limited to) truck-unloading conveyor 26, and other components of the vehicle.

Figure 2:
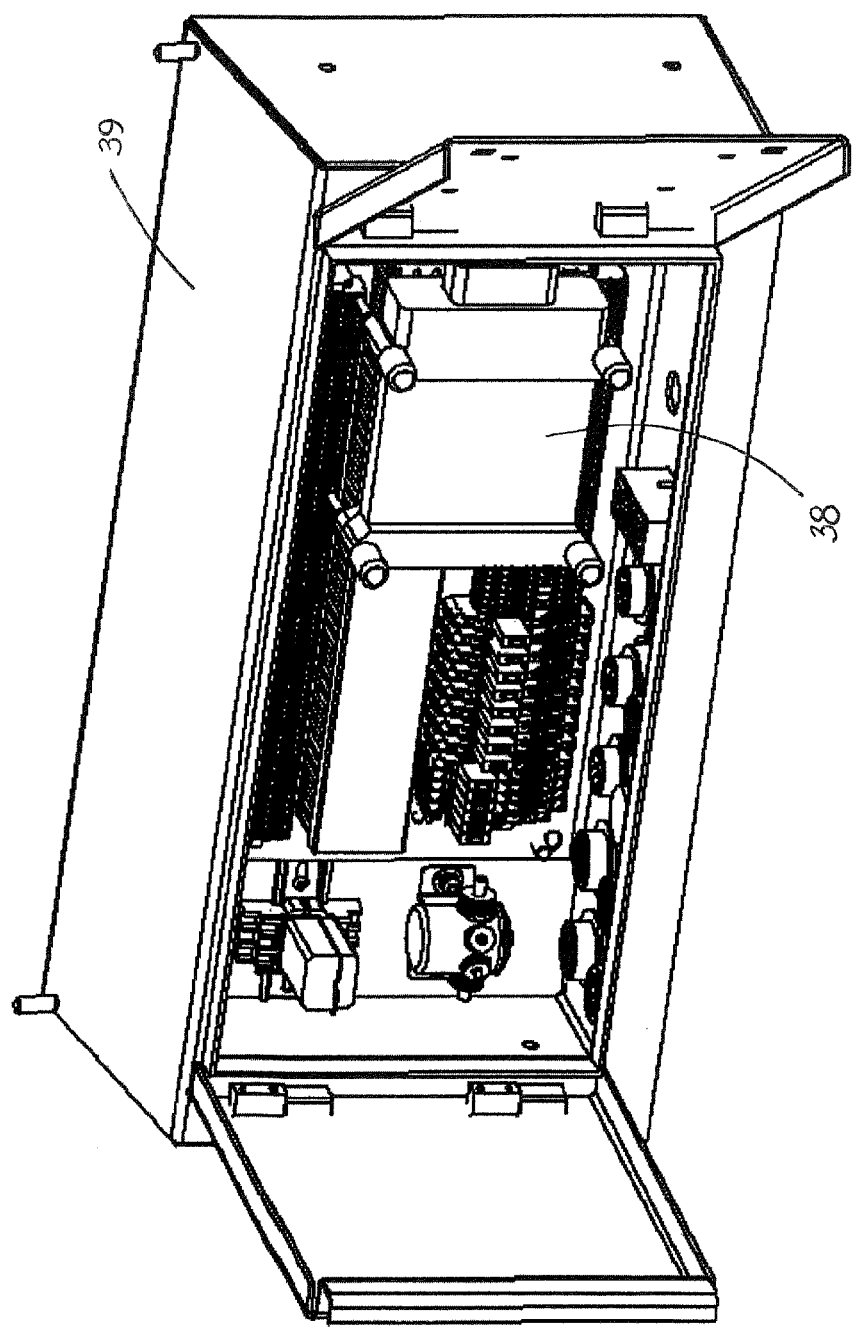
FIG. 2 is a perspective view of a preferred embodiment of a controller for the invention. This controller is mounted in a cabinet that is located in the operator's station of a material transfer vehicle, such as the vehicle shown in FIG. 1.

Vehicle 10 is operated by an operator located at operator station 37. A controller such as microprocessor 38 (shown in FIG. 2) is located in cabinet 39 in operator station 37 and is adapted to operate the invention, among other systems and components of material transfer vehicle 10.

As has been described herein, the invention comprises a system for automatically controlling the flow of asphalt material from the truck-receiving hopper of a material transfer vehicle into the truck-unloading conveyor in order to optimize at least one vehicle operating parameter. The system operates by automatically controlling the placement of a baffle with respect to the truck-unloading hopper, based upon at least one vehicle operating parameter. Preferably, system operation is based upon changes in the hydraulic pressure in the drive system for the truck-unloading conveyor and/or changes in the speed of the engine that provides power for the drive system of the truck-unloading conveyor.

Figure 3:
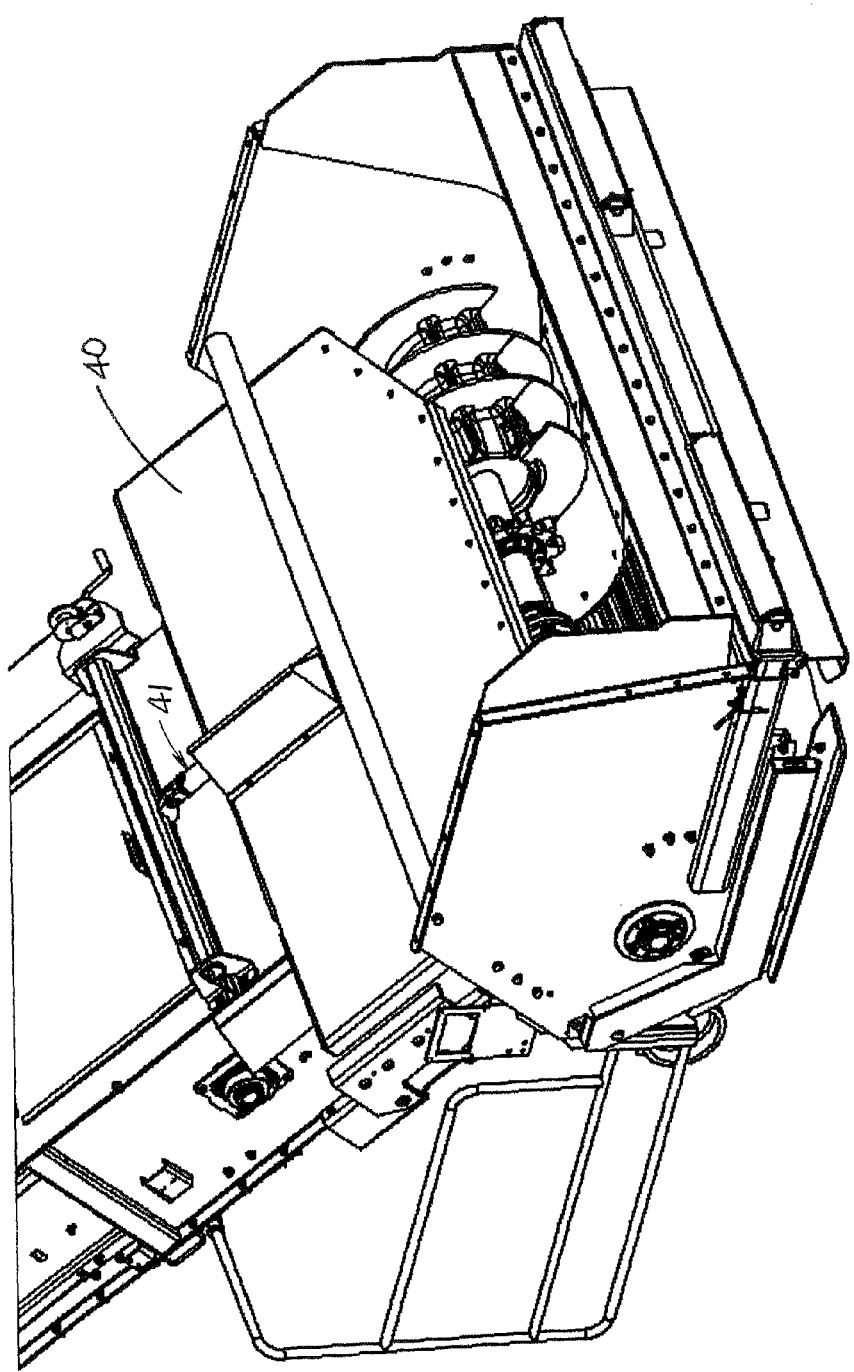
FIG. 3 is a perspective view of the truck-receiving hopper of a material transfer vehicle, showing a first embodiment of a flow-controlling baffle therein.

The invention includes a baffle mounted to truck-receiving hopper 25 which is adapted to increase or decrease the size of the hopper opening into the entry end of truck-unloading conveyor 26. As shown in FIG. 3, one embodiment of this baffle comprises baffle plate 40 that is adapted to move into and out of hopper 25 along a line that is parallel to the long axis of conveyor 26 and is coincident with the plane of baffle plate 40. As the baffle plate moves into and out of the hopper, it decreases or increases the size of the hopper opening into the entry end of truck-unloading conveyor 26, thereby controlling the amount of asphalt material that may pass onto the truck-unloading conveyor. Included within the system illustrated in FIG. 3 is at least one actuator, such as actuator 41, that is provided to move baffle plate 40 into and out of the truck-unloading hopper between a fully-opened maximum-flow position, a minimal-flow position and one or more intermediate positions, including an unloading start position such as is illustrated in FIG. 3. Preferably, actuator 41 is a double acting linear actuator with position feedback capability that is adapted to communicate its relative position to controller (or microprocessor) 38. In the alternative, position sensors (not shown) may be provided to determine the relative location of baffle plate 40 along its movement path and to communicate this information to microprocessor 38. Such position sensors may include linear baffle plate position sensors, limit switches or electronic proximity switches in the truck-unloading hopper, or other mechanisms known to those having ordinary skill in the art by which the relative position of the baffle plate may be detected.

As described above, the truck-unloading hopper may be moved between a lowered asphalt material-receiving position and one or more higher positions, including a raised travel position. It is preferred that the controller communicate with the actuator 41 to move the baffle plate to the fully-opened position when the truck-unloading hopper is raised above the asphalt-receiving position. Then when the truck-unloading hopper is lowered to the asphalt-receiving position, the controller will cause the baffle plate to close to a predetermined unloading start position such as is shown in FIG. 3. The supply truck may then raise its dump body to deposit asphalt material into hopper 25. As the asphalt material begins to slide into hopper 25, the controller will activate truck-unloading conveyor 26 to convey asphalt material from truck-receiving hopper 25 into surge bin 23. The increase in the amount of the asphalt material in the truck-unloading conveyor will cause the hydraulic pressure in the drive system for conveyor 26 to rise and/or will cause the speed of the engine that provides power for the drive system of conveyor 26 to fall. Sensors detecting in increase in the hydraulic pressure in the drive system for conveyor 26 above a first predetermined hydraulic pressure set point and/or a decrease in the speed of the engine that operates the hydraulic pump which powers the hydraulic motors below a first predetermined engine speed set point will transmit a signal to the controller (or microprocessor) 38 which, in turn, will transmit a signal to move the baffle plate to a more closed position. This will reduce the flow rate of asphalt material onto conveyor 26, thus allowing the hydraulic pressure in the operating system for conveyor 26 to decrease to a level below the first predetermined hydraulic pressure set point and/or allowing the speed of the engine that provides power for the drive system of conveyor 26 to increase to a level above the first predetermined engine speed set point. Once the hydraulic pressure in the drive system for conveyor 26 and/or the engine speed has reached a more acceptable level, the controller can again transmit a signal to move the baffle to a more opened position. It is contemplated that several movements of the baffle into and out of hopper 25 may be made during the unloading of a single supply truck.

Figure 5:
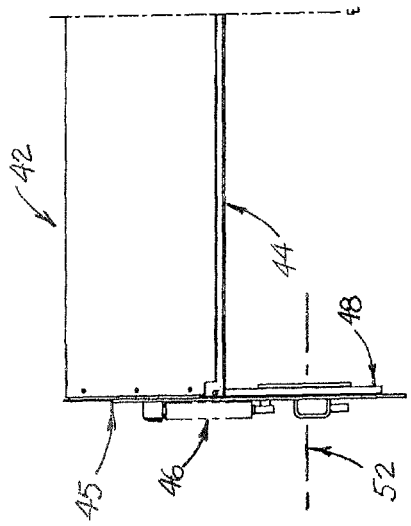
FIG. 5 is a partial front view of the truck-receiving hopper of FIG. 4, taken along line "A".
Figure 4:
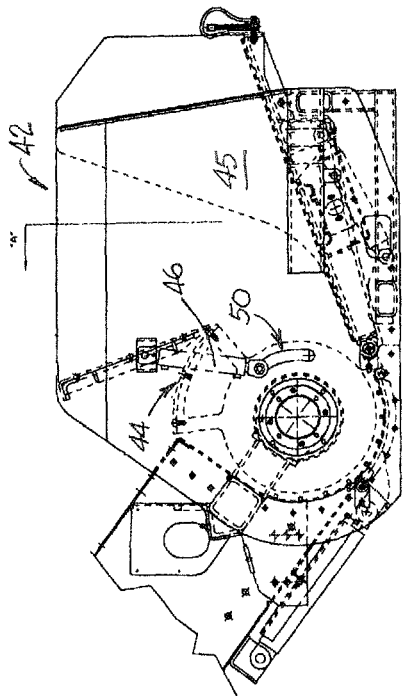
FIG. 4 is a side view, in section, of the truck-receiving hopper of a material transfer vehicle showing a second embodiment of a flow-controlling baffle therein in a fully-opened maximum-flow position.
Figure 6:
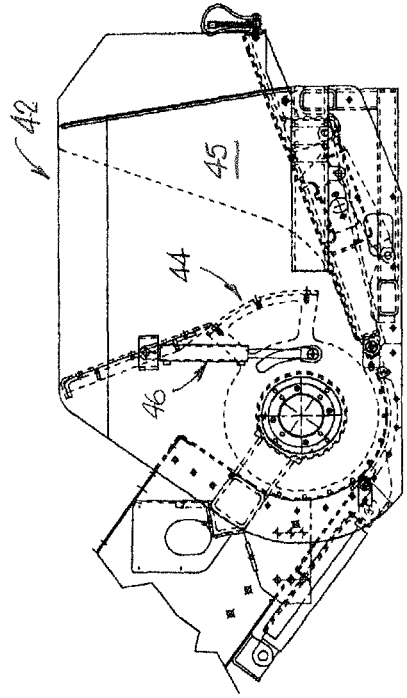
FIG. 6 is a side view, in section, of the truck-receiving hopper of a material transfer vehicle showing a second embodiment of a flow-controlling baffle therein in a minimal-flow position.

A second embodiment of a truck-receiving hopper is shown in FIGS. 4-6. As shown therein, hopper 42 is fitted with adjustable baffle 44. Hopper 42 includes left and right outside walls, one of which, left outside wall 45, is shown in the drawings. This embodiment of the baffle comprises a curved plate that is adapted to move into and out of hopper 42 between a fully-opened maximum-flow position shown in FIGS. 4 and 5, a minimal-flow position shown in FIG. 6 and one or more intermediate positions, including an unloading start position. A system is provided for automatically controlling the placement of the baffle 44 with respect to truck-unloading hopper 42. Included within this system are a pair of baffle actuators, one of which, baffle actuator 46, is shown. Each of these baffle actuators is mounted on one side of hopper 42 and is adapted to cooperate with the other baffle actuator move the baffle into and out of the truck-unloading hopper between a fully-opened maximum-flow position, a minimal-flow position and one or more intermediate positions, including an unloading start position. Preferably, these baffle actuators are double acting linear actuators that are mounted adjacent the outside walls of the hopper. The rod end of each linear actuator is attached to a baffle carrier on each side of the hopper (one of which, baffle carrier 48, is shown). A slot such as slot 50 is provided in the adjacent outside wall of the hopper to allow the baffle carrier to rotate about axis of rotation 52 as the rod end of the linear actuator is extended and retracted. Position sensors (not shown) may be provided to determine the location of the baffle along its movement path. Such position sensors may include baffle position sensors, limit switches or electronic proximity switches in the truck-unloading hopper, and/or linear position sensors within the linear actuators, or other mechanisms known to those having ordinary skill in the art by which the relative position of the baffle may be detected.

In this embodiment of the invention, it is preferred that the controller send a signal to the baffle actuators to move the baffle to a fully-opened position such as is shown in FIGS. 4 and 5 when the truck-unloading hopper is raised above the asphalt-receiving position. Then when the truck-unloading hopper is lowered to the asphalt-receiving position, the controller may send a signal to the baffle actuators to close the baffle to a predetermined unloading start position. The supply truck may then raise its dump body to deposit asphalt material into hopper 42. As the asphalt material begins to slide into hopper 42, the controller will activate a conveyor (similar to conveyor 26 of the embodiment of FIGS. 1 and 3) to convey asphalt material from truck-receiving hopper 42 into the surge bin. The increase in the amount of the asphalt material on the truck-unloading conveyor will cause the hydraulic pressure in the drive system for the conveyor to rise and/or will cause the speed of the engine which provides power for the drive system of the conveyor to fall. Sensors detecting an increase in the hydraulic pressure in the drive system for the conveyor above a predetermined hydraulic pressure set point and/or a decrease in the speed of the engine that operates the hydraulic pump which powers the hydraulic motors below a predetermined engine speed set point will transmit a signal to the controller which, in turn, will transmit a signal to move the baffle to a more closed position. This will reduce the flow rate of asphalt material onto the truck-unloading conveyor, thus allowing the hydraulic pressure in the drive system for the conveyor to decrease to a level below the predetermined hydraulic pressure set point and/or allowing the speed of the engine that provides power for the drive system of the truck-unloading conveyor to increase to a level above the predetermined engine speed set point. Once the hydraulic pressure in the drive system for the conveyor and/or the engine speed has reached a more acceptable level, the controller can again transmit a signal to move the baffle to a more opened position. It is contemplated that several movements of the baffle into and out of hopper 42 may be made during the unloading of a single supply truck. At some point in the unloading operation, the amount of asphalt material in hopper 42 may fall to a level that will cause the hydraulic pressure in the drive system for the truck-unloading conveyor to fall to a predetermined level (or will cause the engine speed to rise to a predetermined level) at which the controller will cause the controller to move the baffle to the fully opened position shown in FIGS. 4 and 5.

Figure 7:
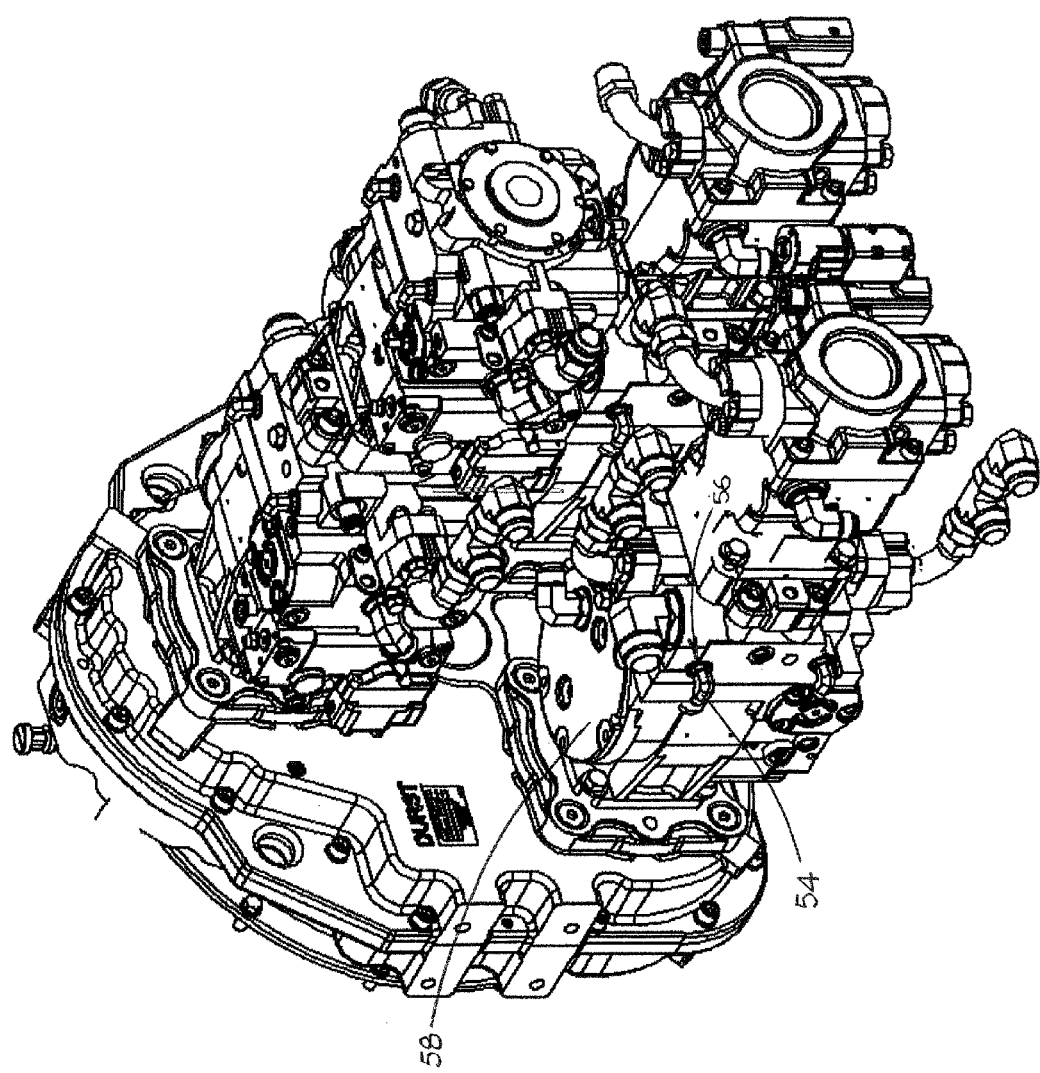
FIG. 7 is a perspective view of a hydraulic pump assembly showing the placement of a pressure transducer that is useful in a preferred embodiment of the invention.

As has been described herein, the system for automatically controlling the flow of asphalt material from the truck-receiving hopper of a material transfer vehicle into the truck-unloading conveyor operates by automatically controlling the hopper opening of the truck-unloading hopper into the truck-unloading conveyor, based upon at least one vehicle operating parameter. Preferably, system operation is based upon changes in the hydraulic pressure in the drive system for the truck-unloading conveyor and/or changes in the speed of the engine that operates the hydraulic pump which powers the hydraulic motors for the truck-unloading conveyor. In a preferred embodiment of the invention, pressure transducer 54 is mounted in the forward direction test port 56 of the hydraulic pump 58 that is a part of the drive system for the truck-unloading conveyor, as shown in FIG. 7. In this embodiment of the invention, transducer 54 is operatively connected to microprocessor 38, and the microprocessor is programmed to reduce the hopper opening into the truck-unloading conveyor when the hydraulic pressure in the drive system for the truck-unloading conveyor increases beyond a predetermined hydraulic pressure setting, and to increase the hopper opening into the truck-unloading conveyor when a the hydraulic pressure in the drive system for the truck-unloading conveyor falls below a predetermined hydraulic pressure setting.

It is also contemplated that system operation may be based upon changes in the speed of the engine that provides power for the truck-unloading conveyor. In the preferred embodiment of the invention, system operation is based upon changes in the speed of the engine that operates the hydraulic pump that powers the hydraulic motors for the drive system of the truck-unloading conveyor. Society of Automotive Engineers ("SAE") J1939 describes the vehicle bus recommended practice for communication among vehicle components. SAE J1939 includes the Controller Area Network ("CAN") specification for electronic communication with an engine. Preferably, microprocessor 38 is wired to the engine for CAN (high) and CAN (low) so that internal sensors in the engine may communicate engine speed to the controller. If the engine is not adapted for electronic communication, a sensor for detecting a signal indicating the number of pulses per revolution of the alternator can be wired to the microprocessor. Alternatively, a speed pick-up sensor may be installed on the flywheel port of the engine and wired to the microprocessor. In either version of the non-electronic embodiment of the invention, the microprocessor can be programmed to convert the detected pulses per revolution to engine speed. In embodiments of the invention based upon changes in the speed of the engine that provides power for the drive system of the truck-unloading conveyor, the microprocessor is programmed to reduce the hopper opening into the truck-unloading conveyor when the engine speed falls below a predetermined setting, and to increase the hopper opening into the truck-unloading conveyor when the engine speed increases above a predetermined setting.

In some embodiments of the invention, the controller may cause the baffle to move more-or-less continuously to increase or decrease the hopper opening into the truck-unloading conveyor to maintain the hydraulic pressure in the drive system for the truck-unloading conveyor within a predetermined range around a predetermined optimal hydraulic pressure set point and/or to maintain the speed of the engine that provides power for the drive system of the truck-unloading conveyor within a predetermined range around a predetermined optimal engine speed set point. Thus, for example, if the optimal set point for the hydraulic pressure in the drive system for the truck-unloading conveyor is "X" psi, the controller could cause the baffle to move more-or-less continuously into and out of the truck-receiving hopper to maintain the hydraulic pressure in the drive system for the truck-unloading conveyor within a range that is between $X_{LOW}$, a predetermined minimum pressure level that is less than X, and $X_{HIGH}$, a predetermined maximum pressure that is greater than X. In some embodiments of the invention both $X_{LOW}$ and $X_{HIGH}$ could be equal to 1000 psi, so that the range in which the controller operates would be X±1000 psi. Similarly, if the optimal set point for the speed of the engine that provides power for the drive system of the truck-unloading conveyor is "Y" rpm, the controller could cause the baffle to move more-or-less continuously into and out of the truck-receiving hopper to maintain the speed of the engine within a range that is between $Y_{LOW}$, a predetermined minimum speed that is less than Y, and $Y_{HIGH}$, a predetermined maximum speed that is greater than Y. In some embodiments of the invention, $Y_{LOW}$ could be equal to 200 rpm and $Y_{HIGH}$ could be equal to 50 rpm, so that the range would be between Y−200 rpm and Y+50 rpm.

In other embodiments of the invention, the controller may cause the baffle to move in a step-wise fashion to increase or decrease the hopper opening into the truck-receiving hopper to maintain the hydraulic pressure in the drive system for the truck-unloading conveyor within a range that is between $X_{LOW}$ and $X_{HIGH}$ and/or to maintain the speed of the engine that provides power for the drive system of the truck-unloading conveyor within a range that is between $Y_{LOW}$ and $Y_{HIGH}$. For example, if the optimal set point for the hydraulic pressure in the drive system for the truck-unloading conveyor is "X" psi, the controller could cause the baffle to move by a first predetermined amount to restrict the flow of material onto the truck-unloading conveyor if the hydraulic pressure in the operating system for the truck-unloading conveyor increases to X+100 psi. Then, if the hydraulic pressure in the operating system continues to increase to X+200 psi, the controller could cause the baffle to move by a second predetermined amount to further restrict the flow of material onto the truck-unloading conveyor. This step-wise movement of the baffle could continue with increases in the hydraulic pressure in the drive system until the baffle is at its minimal flow position when the hydraulic pressure in the drive system reaches $X_{HIGH}$. Similarly, if the hydraulic pressure in the drive system for the truck-unloading conveyor falls to X−100 psi, the controller could cause the baffle to move to a more open position by a first predetermined amount. Then, if the hydraulic pressure in the drive system continues to decrease to X−200 psi, the controller could cause the baffle to move by a second predetermined amount to further open the entry end of the truck-receiving hopper. This step-wise movement of the baffle to a more open position could continue with decreases in the hydraulic pressure in the drive system until the baffle is at its maximum flow position when the hydraulic pressure in the drive system reaches $X_{LOW}$.

In similar fashion, if the optimal set point for the speed of the engine that provides power for the drive system of the truck-unloading conveyor is "Y" rpm, the controller could cause the baffle to move by a first predetermined amount to restrict the flow of material onto the truck-unloading conveyor if the speed of the engine falls to Y−20 rpm. Then, if the engine speed continues to decrease to Y−40 rpm, the controller could cause the baffle to move by a second predetermined amount to further restrict the flow of material onto the truck-unloading conveyor. This step-wise movement of the baffle with respect to the hopper could continue with decreases in the engine speed until the baffle is at its minimal flow position when the engine speed reaches $Y_{LOW}$. Similarly, if the speed of the engine that provides power for the drive system of the truck-unloading conveyor increases to Y+10 rpm, the controller could cause the baffle to move to a more open position by a first predetermined amount. Then, if the engine speed continues to increase to Y+20 rpm, the controller could cause the baffle to move by a second predetermined amount to a more open position. This step-wise movement of the baffle with respect to the hopper could continue with increases in the engine speed until the baffle is at its maximum flow position when the engine speed reaches $Y_{HIGH}$.

In other embodiments of the invention, the controller may cause the baffle to move between the fully opened position and one or more intermediate positions based upon the passage of predetermined time increments.

Although this description contains many specifics, these should not be construed as limiting the scope of the invention but as merely providing illustrations of the presently preferred embodiments thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A material transfer vehicle comprising:
   (a) a truck-receiving hopper that is adapted to receive asphalt material from a truck;
   (b) a truck-unloading conveyor that is adapted to receive asphalt material from the truck-receiving hopper, said truck-unloading conveyor having an entry end that includes a hopper opening adjacent to the truck-receiving hopper;
   (c) a drive system for the truck-unloading conveyor that includes an engine and a hydraulic circuit;
   (d) a system for automatically controlling the flow of asphalt material from the truck-receiving hopper into the entry end of the truck-unloading conveyor in order to optimize at least one vehicle operating parameter selected from the group consisting of the hydraulic pressure in the hydraulic circuit of the drive system and the speed of the engine in the drive system, said system comprising:
   (i) a baffle that is mounted to the truck-receiving hopper adjacent to the entry end of the truck-unloading conveyor and adapted to increase or decrease the hopper opening into the truck-unloading conveyor;
   (ii) a controller that is operatively connected to the baffle and adapted to cause the baffle to increase or decrease the hopper opening into the truck-unloading conveyor;
   (iii) a sensor for directly detecting the at least one vehicle operating parameter, said sensor being operatively connected to the controller so that changes in the at least one vehicle operating parameter can be communicated to the controller;
   wherein the controller is adapted to control the flow rate of asphalt material into the hopper opening of the truck-unloading conveyor in order to optimize the at least one vehicle operating parameter.

2. The material transfer vehicle of claim 1:
   (a) wherein the baffle comprises a baffle plate;
   (b) which includes an actuator that is operatively connected to the baffle plate and adapted to move the baffle plate into and out of the truck-receiving hopper between a fully-opened maximum-flow position, a minimal-flow position and one or more intermediate positions including an unloading start position.

3. The material transfer vehicle of claim 2:
   (a) which includes a mechanism for moving the truck-unloading hopper between an asphalt-receiving position and one or more positions that are higher than the asphalt-receiving position;
   (b) wherein the controller is adapted to communicate with the actuator:
   (i) to automatically move the baffle plate to the fully-opened position when the truck-unloading hopper is moved to a position that is higher than the asphalt-receiving position;
   (ii) to automatically move the baffle plate to the unloading start position when the truck-unloading hopper is moved to the asphalt-receiving position.

4. The material transfer vehicle of claim 1:
   (a) wherein the at least one vehicle operating parameter selected to be optimized comprises the hydraulic pressure in the hydraulic circuit of the drive system;
   (b) which includes a pressure transducer that is operatively connected to the controller and adapted to communicate changes in the hydraulic pressure in the drive system for the truck-unloading conveyor to the controller;
   (c) wherein the controller is programmed to reduce the hopper opening into the truck-unloading conveyor when an increase in the hydraulic pressure in the drive system for the truck-unloading conveyor exceeds a predetermined hydraulic pressure setting.

5. The material transfer vehicle of claim 4 wherein the controller is programmed to increase the hopper opening into the truck-unloading conveyor when the hydraulic pressure in the drive system for the truck-unloading conveyor decreases from the predetermined hydraulic pressure setting.

6. The material transfer vehicle of claim 1:
   (a) wherein the at least one vehicle operating parameter selected to be optimized comprises the speed of the engine in the drive system;
   (b) which includes a sensor that is operatively connected to the controller and adapted to communicate changes in the speed of the engine that provides power for the drive system of the truck-unloading conveyor to the controller;

(c) wherein the controller is programmed to reduce the hopper opening into the truck-unloading conveyor when the speed of the engine falls below a predetermined engine speed level.

7. The material transfer vehicle of claim 6 wherein the controller is programmed to increase the hopper opening into the truck-unloading conveyor when the speed of the engine increases from the predetermined engine speed level.

8. A material transfer vehicle comprising:
(a) a truck-receiving hopper that is adapted to receive asphalt material from a truck, said hopper having left and right outside walls;
(b) a truck-unloading conveyor that is adapted to receive asphalt material from the truck-receiving hopper, said truck-unloading conveyor having an entry end that includes a hopper opening adjacent to the truck-receiving hopper;
(c) a system for automatically controlling the flow of asphalt material from the truck-receiving hopper into the entry end of the truck-unloading conveyor in order to optimize at least one vehicle operating parameter, said system comprising:
(i) a baffle that is mounted to the truck-receiving hopper adjacent to the entry end of the truck-unloading conveyor and adapted to increase or decrease the hopper opening into the truck-unloading conveyor, said baffle comprising a curved plate that is mounted to the truck-receiving hopper adjacent to the entry end of the truck-unloading conveyor and adapted to move into and out of the hopper between a fully-opened maximum-flow position, a minimal-flow position and one or more intermediate positions, including an unloading start position;
(ii) a left baffle actuator and a right baffle actuator, said left baffle actuator being mounted adjacent the left outside wall of the hopper and said right baffle actuator being mounted adjacent the right outside wall of the hopper, said left baffle actuator being adapted to cooperate with the right baffle actuator to move the baffle plate into and out of the truck-unloading hopper between the fully-opened maximum-flow position, the minimal-flow position and the one or more intermediate positions, including the unloading start position;
(iii) a controller that is operatively connected to the baffle and adapted to cause the baffle to increase or decrease the hopper opening into the truck-unloading conveyor;
(iv) a sensor for detecting the at least one vehicle operating parameter, said sensor being operatively connected to the controller so that changes in the at least one vehicle operating parameter can be communicated to the controller;
wherein the controller is adapted to control the flow rate of asphalt material into the hopper opening of the truck-unloading conveyor in order to optimize the at least one vehicle operating parameter.

9. The material transfer vehicle of claim 8:
(a) wherein the left baffle actuator is a double acting linear actuator having a left rod end;
(b) which includes a left baffle carrier on the left side of the hopper that is attached to the left rod end of the left baffle actuator;
(c) wherein the left outside wall of the hopper includes a left side slot to allow the left baffle carrier to rotate about an axis of rotation as the left rod end of the left baffle actuator is extended and retracted;
(d) wherein the right baffle actuator is a double acting linear actuator having a right rod end;
(e) which includes a right baffle carrier on the right side of the hopper that is attached to the right rod end of the right baffle actuator;
(f) wherein the right outside wall of the hopper includes a right side slot to allow the right baffle carrier to rotate about an axis of rotation as the right rod end of the right baffle actuator is extended and retracted.

10. A method for operating a material transfer vehicle having:
(a) a truck-receiving hopper that is adapted to receive asphalt material from a truck;
(b) a truck-unloading conveyor that is adapted to receive asphalt material from the truck-receiving hopper, said truck-unloading conveyor having an entry end that includes a hopper opening adjacent to the truck-receiving hopper;
(c) a drive system for the truck-unloading conveyor that includes an engine and a hydraulic circuit;
said method comprising the steps of:
(d) providing:
(i) a baffle that is mounted to the truck-receiving hopper adjacent to the entry end of the truck-unloading conveyor and adapted to increase or decrease the hopper opening into the truck-unloading conveyor;
(ii) a controller that is operatively connected to the baffle and adapted to cause the baffle to increase or decrease the hopper opening into the truck-unloading conveyor;
(iii) a sensor for detecting at least one vehicle operating parameter selected from the group consisting of the hydraulic pressure in the hydraulic circuit of the drive system and the speed of the engine in the drive system, said sensor being operatively connected to the controller so that changes in the at least one vehicle operating parameter can be communicated to the controller; and
(e) operating the controller so as to control the flow rate of asphalt material into the hopper opening of the truck-unloading conveyor in order to optimize the at least one vehicle operating parameter of the material transfer vehicle.

11. The method of claim 10 which includes:
(a) selecting the hydraulic pressure in the hydraulic circuit of the drive system as the at least one vehicle operating parameter to be optimized;
(b) operating the controller to automatically control the flow of asphalt material from the truck-receiving hopper of a material transfer vehicle into the truck-unloading conveyor in order to optimize the hydraulic pressure in the drive system for the truck-unloading conveyor.

12. The method of claim 11 which includes:
(a) setting the optimal set point for the hydraulic pressure in the hydraulic drive system for the truck-unloading conveyor at a predetermined level equal to "X" psi;
(b) setting a maximum hydraulic pressure that is greater than X and equal to $X_{HIGH}$ for the hydraulic drive system for the truck-unloading conveyor, at which maximum hydraulic pressure $X_{HIGH}$ the controller will cause the baffle to decrease the hopper opening;
(c) setting a minimum hydraulic pressure that is less than X and equal to $X_{LOW}$ for the hydraulic drive system for the truck-unloading conveyor, at which minimum hydraulic pressure $X_{LOW}$ the controller will cause the baffle to increase the hopper opening.

13. The method of claim 12, wherein the controller causes the baffle to move in a step-wise fashion to increase or decrease the hopper opening into the truck-receiving hopper to maintain the hydraulic pressure in the hydraulic drive system for the truck-unloading conveyor within a range that is between $X_{LOW}$ and $X_{HIGH}$.

14. The method of claim 10 which includes:
(a) selecting the speed of the engine in the drive system as the at least one vehicle operating parameter to be optimized;
(b) operating the controller to automatically control the flow of asphalt material from the truck-receiving hopper of the material transfer vehicle into the truck-unloading conveyor in order to optimize the speed of the engine that supplies power for the truck-unloading conveyor.

15. The method of claim 14 which includes:
(a) setting the optimal set point for the for the speed of the engine that supplies power for the truck-unloading conveyor at a predetermined level equal to "Y" rpm;
(b) setting a maximum speed that is greater than Y and equal to $Y_{HIGH}$ for the speed of the engine that supplies power for the truck-unloading conveyor, at which maximum speed $Y_{HIGH}$ the controller will cause the baffle to increase the hopper opening;
(c) setting a minimum speed that is less than Y and equal to $Y_{LOW}$ for the speed of the engine that supplies power for the truck-unloading conveyor, at which minimum speed $Y_{LOW}$ the controller will cause the baffle to decrease the hopper opening.

16. The method of claim 15, wherein the controller causes the baffle to move in a step-wise fashion to increase or decrease the hopper opening into the truck-receiving hopper to maintain the speed of the engine that supplies power for the truck-unloading conveyor within a range that is between $Y_{LOW}$ and $Y_{HIGH}$.

17. The method of claim 10 which includes:
(a) providing the baffle in the form of a baffle plate;
(b) providing an actuator that is operatively connected to the baffle plate and adapted to move the baffle plate into and out of the truck-receiving hopper between a fully-opened maximum-flow position, a minimal-flow position and one or more intermediate positions including an unloading start position.

18. The method of claim 17, wherein:
(a) the material transfer vehicle includes a mechanism for moving the truck-unloading hopper between an asphalt-receiving position and one or more positions that are higher than the asphalt-receiving position;
(b) the controller is adapted to communicate with the actuator:
(i) to automatically move the baffle plate to the fully-opened position when the truck-unloading hopper is moved to a position that is higher than the asphalt-receiving position;
(ii) to automatically move the baffle plate to the unloading start position when the truck-unloading hopper is moved to the asphalt-receiving position.

\* \* \* \* \*